United States Patent
Sayenko et al.

(10) Patent No.: US 11,723,040 B2
(45) Date of Patent: Aug. 8, 2023

(54) SYSTEMS AND METHODS FOR UNLICENSED WIDE-BAND TRANSMISSION

(71) Applicant: Apple Inc., Cupertino, CA (US)

(72) Inventors: Alexander Sayenko, Munich (DE); Anatoliy Sergey Ioffe, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 17/213,883

(22) Filed: Mar. 26, 2021

(65) Prior Publication Data

US 2022/0132554 A1   Apr. 28, 2022

Related U.S. Application Data

(60) Provisional application No. 63/104,021, filed on Oct. 22, 2020.

(51) Int. Cl.
*H04W 72/23* (2023.01)
*H04W 74/08* (2009.01)
*H04W 72/0453* (2023.01)

(52) U.S. Cl.
CPC ....... *H04W 72/23* (2023.01); *H04W 72/0453* (2013.01); *H04W 74/0808* (2013.01)

(58) Field of Classification Search
CPC .......................... H04W 72/0453; H04L 5/001
See application file for complete search history.

(56) References Cited

U.S. PATENT DOCUMENTS

| | | | |
|---|---|---|---|
| 2014/0115637 A1* | 4/2014 | Stanforth | H04W 4/02 725/62 |
| 2021/0112520 A1* | 4/2021 | Yerramalli | H04L 5/0048 |
| 2022/0108618 A1* | 4/2022 | Kumar | H04W 48/04 |

OTHER PUBLICATIONS

Chiou-Wei Tsai, "LS on UE capability on wideband carrier operation for NR-U," 3GPP TSG-RAN WG1 Meeting #101, e-Meeting, May 25-Jun. 5, 2020, 2 pages.

Jing Sun, "Revised WID on NR-based Access to Unlicensed Spectrum," 3GPP TSG RAN Meeting #86, Sitges, Spain, Dec. 9-12, 2019, 8 pages.

* cited by examiner

*Primary Examiner* — Kevin Kim
(74) *Attorney, Agent, or Firm* — Fletcher Yoder PC

(57) ABSTRACT

For wideband operation in the unlicensed spectrum, a network operator may allocate a channel having multiple sub-bands to user equipment. The presently disclosed embodiments enable the user equipment to select one of multiple noncontiguous sub-bands and/or blocks of contiguous sub-bands that are available in the channel, and transmit data over the selected one of the noncontiguous available sub-bands and/or blocks of contiguous available sub-bands. The user equipment may select the one of the noncontiguous available sub-bands and/or blocks of contiguous available sub-bands of the channel based on the largest block of contiguous available sub-bands, the largest grant size, the best signal quality, the greatest estimated throughput, and/or the highest priority level. Moreover, in cases where data is transmitted using contiguous available sub-bands, guard bands disposed in between the contiguous available sub-bands may also be used to transmit data.

17 Claims, 8 Drawing Sheets

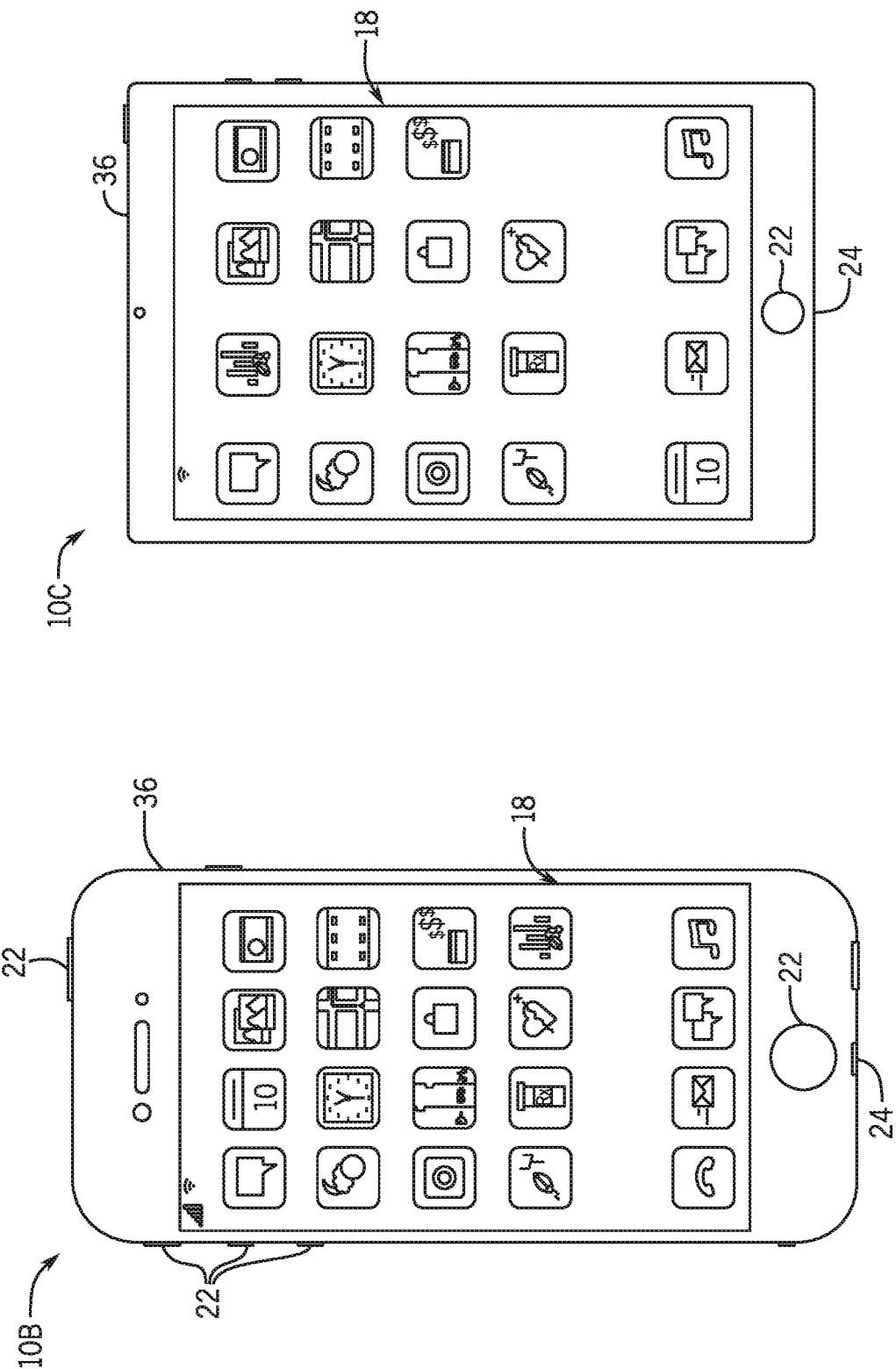

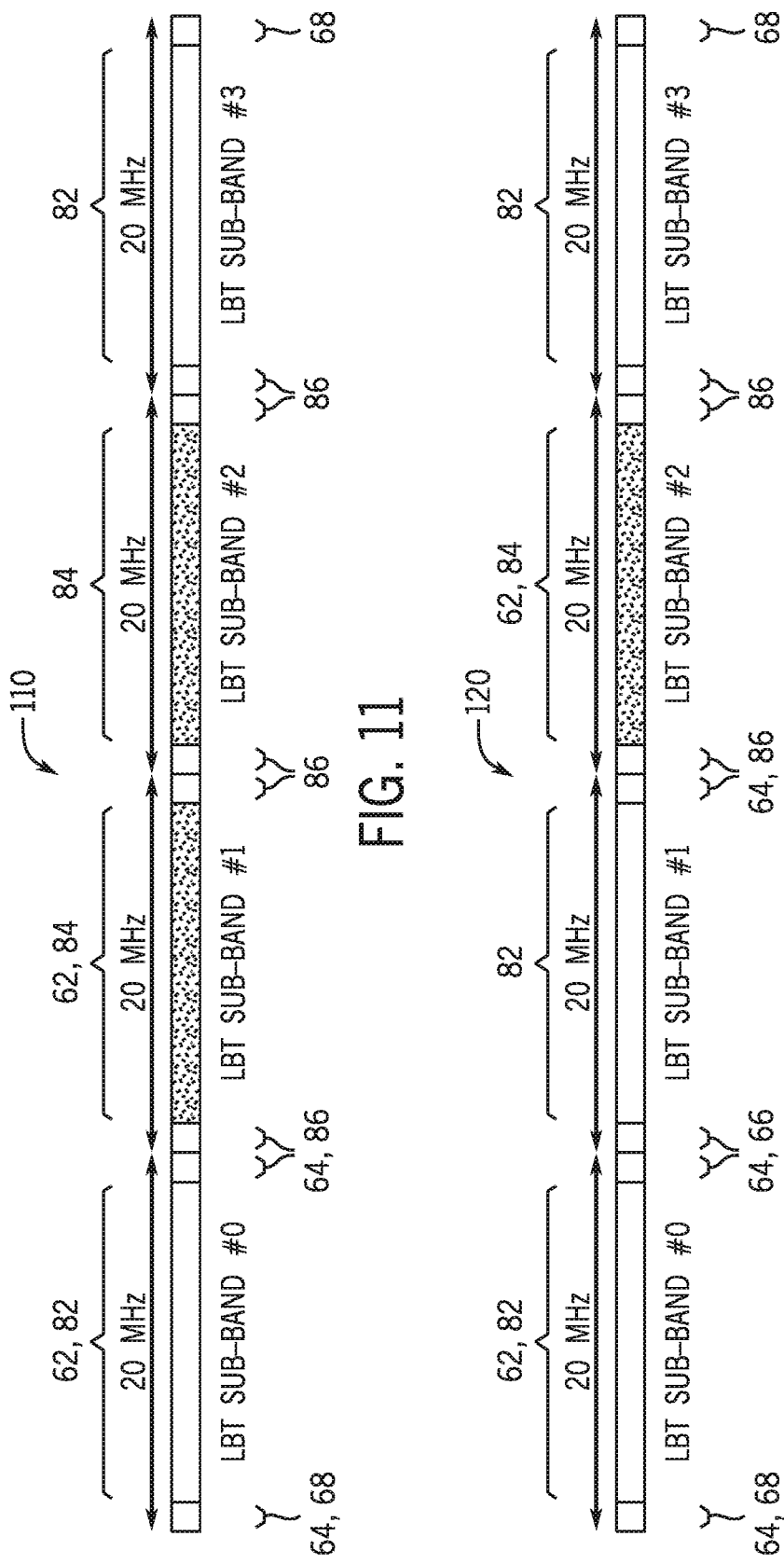

SYSTEMS AND METHODS FOR UNLICENSED WIDE-BAND TRANSMISSION

CROSS-REFERENCE TO RELATED APPLICATION

This application claims the benefit of U.S. Provisional Application Ser. No. 63/104,021, entitled "SYSTEMS AND METHODS FOR UNLICENSED WIDE-BAND TRANSMISSION," filed Oct. 22, 2020, which is hereby incorporated by reference in its entirety for all purposes.

BACKGROUND

The present disclosure relates generally to wireless communication, and more particularly, to wide-band transmission on an unlicensed radio frequency band.

Wireless communication systems are rapidly growing in usage. Wireless electronic devices or user equipment, such as smartphones and tablet computers, are becoming increasingly sophisticated. In addition to supporting telephone calls, many wireless electronic devices now provide access to the internet, email, text messaging, and navigation using the global positioning system (GPS), and are capable of operating sophisticated applications that utilize these functionalities.

Enabling more radio frequency spectrums for communication, including an unlicensed spectrum (e.g., a 5 gigahertz (GHz) band (e.g., 5150-5925 megahertz (MHz)) or a 6 GHz band (e.g., 5925-7125 MHz)), facilitates transmitting and receiving greater volumes of data over communication networks. However, communicating over the unlicensed spectrum requires meeting certain criteria.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

For wideband operation in an unlicensed spectrum (e.g., a 5 gigahertz (GHz) band (e.g., 5150-5925 megahertz (MHz)) or a 6 GHz band (e.g., 5925-7125 MHz)), a network operator may allocate a channel to user equipment when requested. The channel may enable a single carrier operation and have a large bandwidth (e.g., 40-80 MHz) with sub-bands having bandwidths of 20 MHz. The $3^{rd}$ Generation Partnership Project (3GPP) family of standards organizations may permit the user equipment to transmit data when all sub-bands of the channel are available (as determined by a Listen Before Talk (LBT) procedure) in a first mode, only a single sub-band of the channel is available in a second mode, or only a single block of contiguous sub-bands of the channel is available in a third mode.

However, there is not an operational mode for transmitting data over multiple noncontiguous available sub-bands and/or blocks of contiguous available sub-bands in the channel, and, accordingly, the user equipment may not transmit data in such a scenario. The presently disclosed embodiments enable the user equipment to select one sub-band out of a set of noncontiguous sub-bands and/or one block out of a set of noncontiguous blocks of contiguous sub-bands that are available in the channel, and transmit data over the selected one of the noncontiguous available sub-bands and/or blocks of contiguous available sub-bands, as if operating under the second mode or third mode. If the outcome of the LBT procedure results in noncontiguous blocks of available sub-bands and/or noncontiguous available sub-bands, the user equipment may select the one of the noncontiguous available sub-bands and/or blocks of contiguous available sub-bands of the channel based on one or more factors, including the largest block of contiguous available sub-bands, the largest grant size, the best signal quality, the greatest estimated throughput, and/or the highest priority level. In this manner, the user equipment may transmit data in a wideband operation over the unlicensed spectrum even when there are multiple noncontiguous available sub-bands and/or blocks of contiguous available sub-bands in an allocated channel.

Moreover, while channels having bandwidths of 20-80 MHz with sub-bands having bandwidths of 20 MHz are used as examples in the present disclosure, it should be understood that the presently disclosed techniques may also be applicable to other channel bandwidths (e.g., greater than 80 MHz, 160 MHz, 320 MHz) and/or other sub-band bandwidths. Additionally, while the 5 GHz and 6 GHz bands are used as examples of frequency bands in the unlicensed spectrum, it should be understood that the presently disclosed techniques may also be applicable to other, future bands in the unlicensed spectrum (e.g., the 60 GHz band). Furthermore, while the presently disclosed embodiments are described as having the user equipment select one sub-band out of a set of noncontiguous available sub-bands and/or a block of contiguous available sub-bands of an allocated channel for transmission, it should be understood that at least some portion of this decision-making could alternatively or additionally be performed by the network operator and/or a base station (e.g., a next generation NodeB (gNB) for 5G networks).

In one embodiment, a method includes requesting a channel allocation from a network operator, receiving a grant of a channel having a multiple sub-bands, determining availability of the multiple sub-bands, and determining that the multiple sub-bands include a block of contiguous available sub-bands and at least one available sub-band, the block of contiguous available sub-bands being noncontiguous with the at least one available sub-band. The method also includes transmitting data on only the block of contiguous available sub-bands.

In another embodiment, one or more tangible, non-transitory, computer-readable storage media storing executable instructions that, when executed by one or more processors, cause the one or more processors to request a channel allocation from a network operator, receive a grant of a channel having multiple sub-bands, determine availability of the multiple sub-bands, and, in response to determining that all sub-bands of the plurality of sub-bands are available, transmitting data on all the sub-bands. The instructions also cause the one or more processors to, in response to determining that only one sub-band or only one block of contiguous sub-bands of the multiple sub-bands are available, transmitting the data on the only one sub-band or the only one block of contiguous sub-bands. The instructions further cause the one or more processors to, in response to determining that multiple noncontiguous blocks of contiguous sub-bands of the multiple sub-bands are available, multiple noncontiguous sub-bands of the multiple sub-bands are available, or at least one noncontiguous blocks of contiguous sub-bands and at least one sub-band of the multiple sub-bands are available, transmit the data on only one of the multiple noncontiguous blocks, only one of the multiple noncontiguous sub-bands, or only one of the at least one noncontiguous blocks of contiguous sub-bands and the at least one sub-band of the multiple sub-bands.

In yet another embodiment, an electronic device includes a transmitter that transmits uplink data, a receiver that receives downlink data, and one or more processors communicatively coupled to the transmitter and the receiver. The one or more processors send a request for a channel allocation to a network operator via the transmitter, receive a grant of a channel having multiple sub-bands via the receiver, and determine availability of the multiple sub-bands via the receiver. The one or more processors also determine that the multiple sub-bands include multiple noncontiguous blocks of contiguous sub-bands that are available, multiple noncontiguous sub-bands that are available, or both. The one or more processors further transmit the uplink data on only one of the multiple noncontiguous blocks of contiguous sub-bands or only one of the multiple noncontiguous sub-bands that are available via the transmitter.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a handheld device representing a second embodiment of the electronic device of FIG. 1;

FIG. 4 is a front view of another handheld device representing a third embodiment of the electronic device of FIG. 1;

FIG. 11 is a diagram of a channel allocated to the user equipment of the communication system of FIG. 7 for wideband operation in which multiple, noncontiguous sub-bands are determined to be available, according to embodiments of the present disclosure;

FIG. 12 is a diagram of a channel allocated to the user equipment 10 of the communication system of FIG. 7 for wideband operation in which a noncontiguous sub-band and a noncontiguous block of contiguous sub-bands are determined to be available, according to embodiments of the present disclosure;

DETAILED DESCRIPTION

Figure 1:
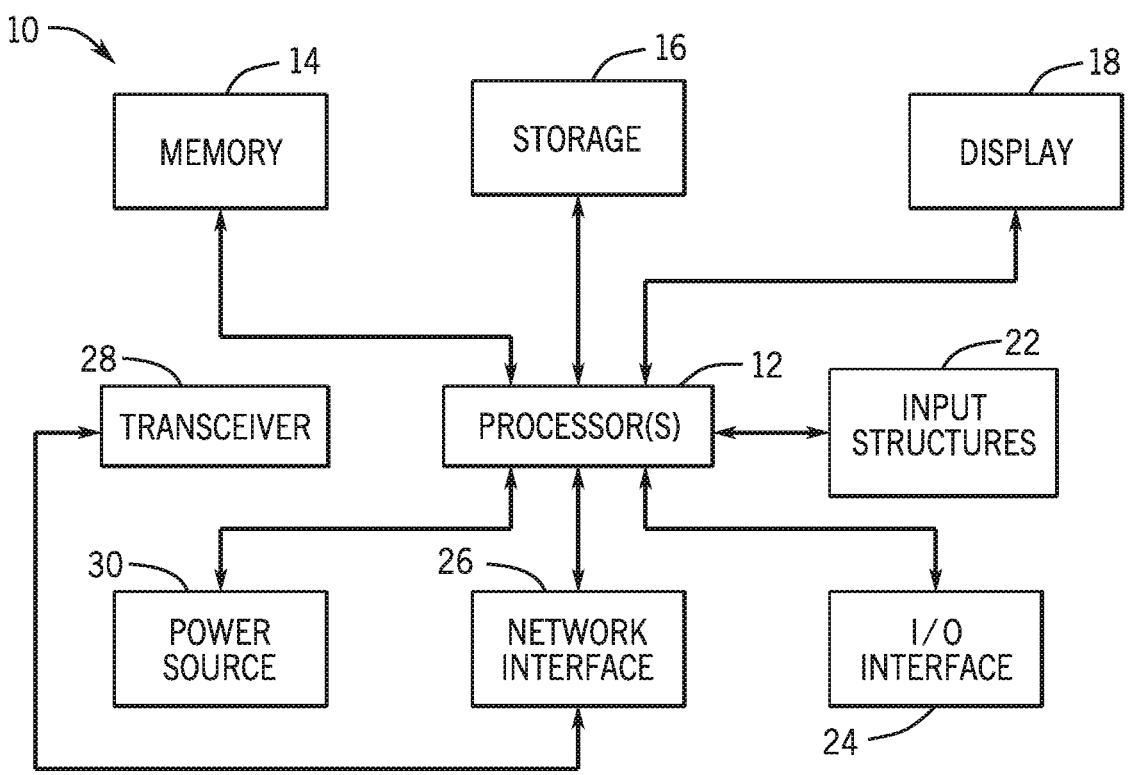
FIG. 1 is a schematic block diagram of an electronic device including a transceiver, in accordance with an embodiment of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The user equipment may communicatively couple to communication networks, such as $4^{th}$ generation (4G) or Long-Term Evolution (LTE) access networks and $5^{th}$ generation (5G) or New Radio (NR) communication networks, to communicate with one another. The networks may be deployed by network operators through a variety of technologies including, but not limited to, access network base stations, such as an eNodeB (eNB) for 4G networks and/or a next generation NodeB (gNB) for 5G networks.

Each communication network may perform data transmission and reception on an allocated frequency spectrum. The frequency spectrum allocation may change between countries, but there is an international consensus to enable use of certain frequency bands, such as a 5 gigahertz (GHz) band (e.g., 5150-5925 megahertz (MHz)) or a 6 GHz band (e.g., 5925-7125 MHz), through the NR communication network without an issued license. As such, this frequency spectrum and/or frequency bands are commonly referred to as "unlicensed", or collectively as the NR-unlicensed spectrum (NR-U spectrum). It should be noted that the $3^{rd}$ Generation Partnership Project (3GPP) is currently making efforts to standardize NR operation over the unlicensed spectrum. Moreover, the 3GPP may add other frequency spectrums or bands to the unlicensed spectrum, such as the 60 GHz band (e.g. 57-71 GHz).

Because the spectrum is unlicensed, multiple user equipment and/or communication networks may vie for the same channels, which may result in data collisions on those channels. Accordingly, the user equipment may perform Listen Before Talk (LBT) procedures prior to transmitting or receiving data on a channel, where the user equipment senses or "listens" to the channel to determine whether there is ongoing communication that may interfere with its transmission and/or reception. If the user equipment determines that the channel is clear or available, then the user equipment may commence transmission and/or reception.

As greater volumes of data are transmitted over communication networks, the unlicensed spectrum enables certain opportunities for network operators. For example, large data volumes of non-critical data may be offloaded to the unlicensed spectrum. Additionally, non-public private networks may be deployed on the unlicensed spectrum. Moreover, enterprise and/or factory environments may be implemented using the unlicensed spectrum.

However, operation of the user equipment in the unlicensed spectrum to follow certain modes enabled by the network operator as promulgated by the 3GPP may limit or reduce opportunities to transmit data, thus hampering operating efficiency of the user equipment and the communication network. In particular, for wideband operation (e.g., a single carrier operation using a channel with a bandwidth of 20-80 MHz with sub-bands having bandwidths of 20 MHz), the user equipment may send its mode capability (e.g., a list of modes under which the user equipment may operate) to the network operator, and the network operator may grant the user equipment operation under one or more modes of the list of modes, as well as an allocated channel. For a first mode, transmission by user equipment is permitted if all sub-bands of an allocated channel are available (as determined by the LBT procedure). For a second mode, transmission by user equipment is permitted if only a single sub-band of the channel is available. For a third mode, transmission by user equipment is permitted if only a single block of contiguous sub-bands of the channel is available. However, there is not an operational mode for transmitting data over multiple noncontiguous available sub-bands and/or blocks of contiguous available sub-bands in the channel, and, accordingly, the user equipment may not transmit data in such a scenario.

Various processes are disclosed that may enable transmission of data in a wideband operation over an unlicensed spectrum (e.g., a 5 gigahertz (GHz) band (e.g., 5150-5925 megahertz (MHz)) or a 6 GHz band (e.g., 5925-7125 MHz)) when there are multiple noncontiguous available sub-bands and/or blocks of contiguous available sub-bands in an allocated channel. It should be understood that multiple noncontiguous available sub-bands and/or blocks of contiguous available sub-bands refers to multiple noncontiguous available sub-bands in the allocated channel, multiple blocks of contiguous available sub-bands in the allocated channel, and/or at least one available sub-band and at least one block of contiguous available sub-bands in the allocated channel. The processes may apply to a variety of electronic devices (e.g., user equipment). With the foregoing in mind, a general description of suitable electronic devices that may enable such operation is provided below.

Turning first to FIG. 1, an electronic device 10 (e.g., user equipment) according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. The one or more processors 12 may include one or more baseband processors that manage wireless communication and/or radio functions, and, in some embodiments, may at least partially be disposed in the network interface 26, the transceiver 28, and/or one or more modems. It should be noted that FIG. 1 is merely one example of a particular embodiment and is intended to illustrate the types of elements that may be present in the electronic device 10.

Figure 2:
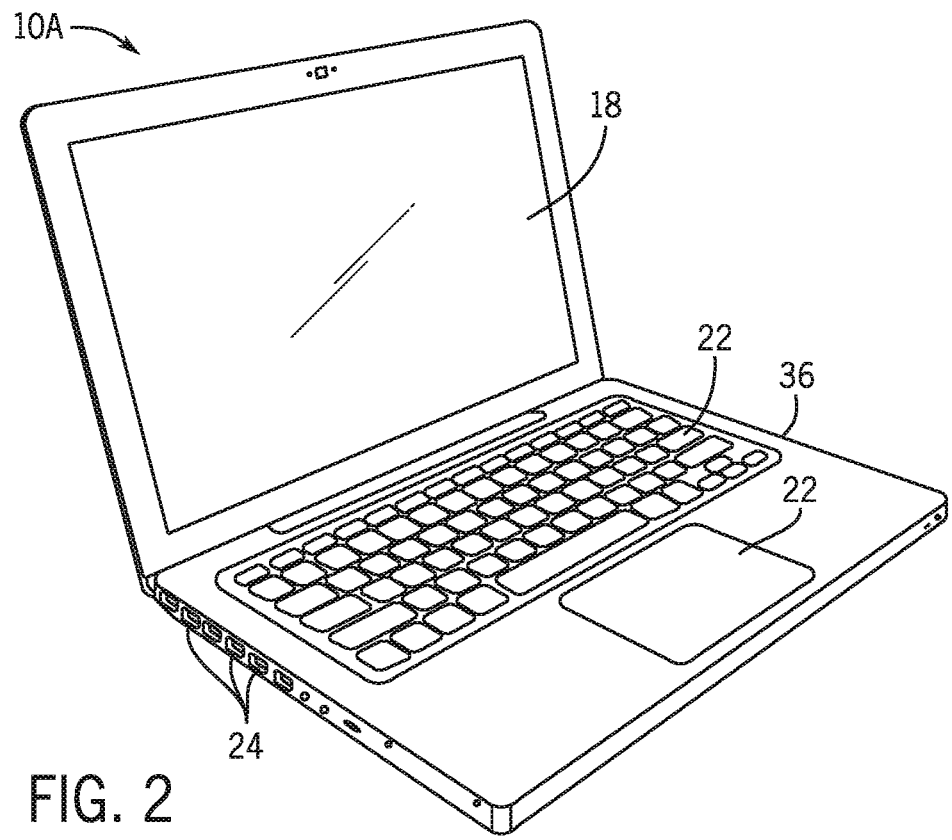
FIG. 2 is a perspective view of a notebook computer representing a first embodiment of the electronic device of FIG. 1.
Figure 5:
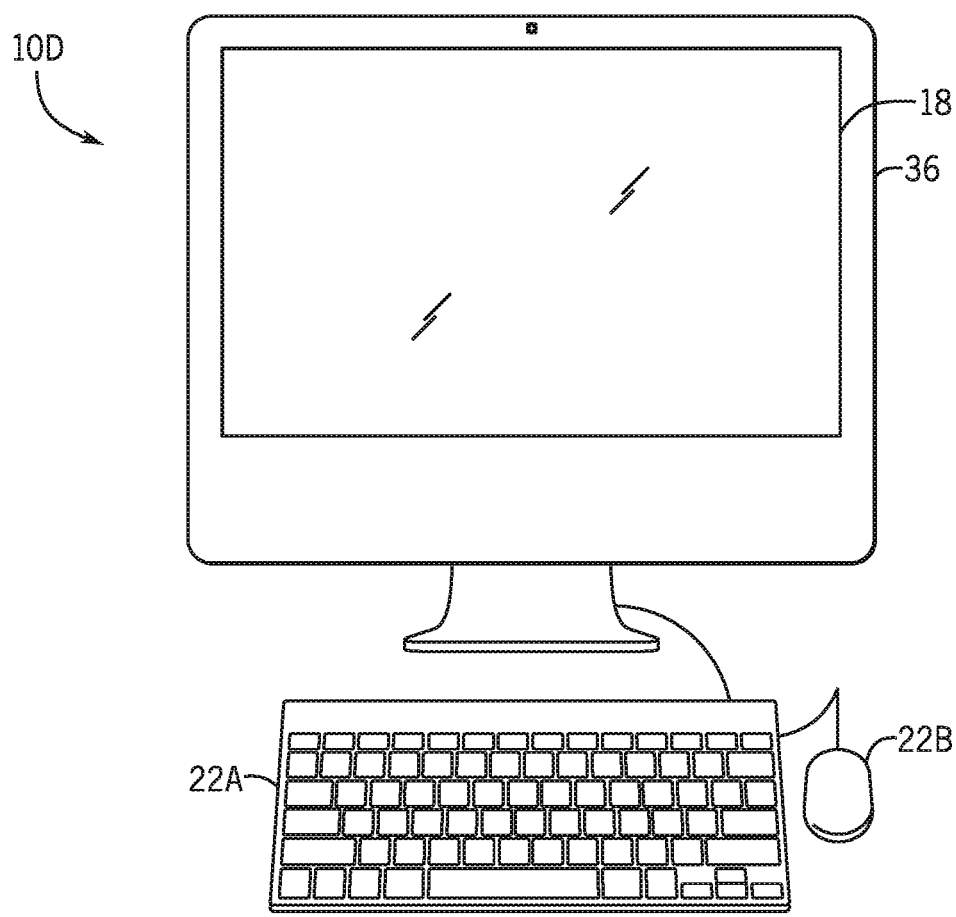
FIG. 5 is a front view of a desktop computer representing a fourth embodiment of the electronic device of FIG. 1.
Figure 6:
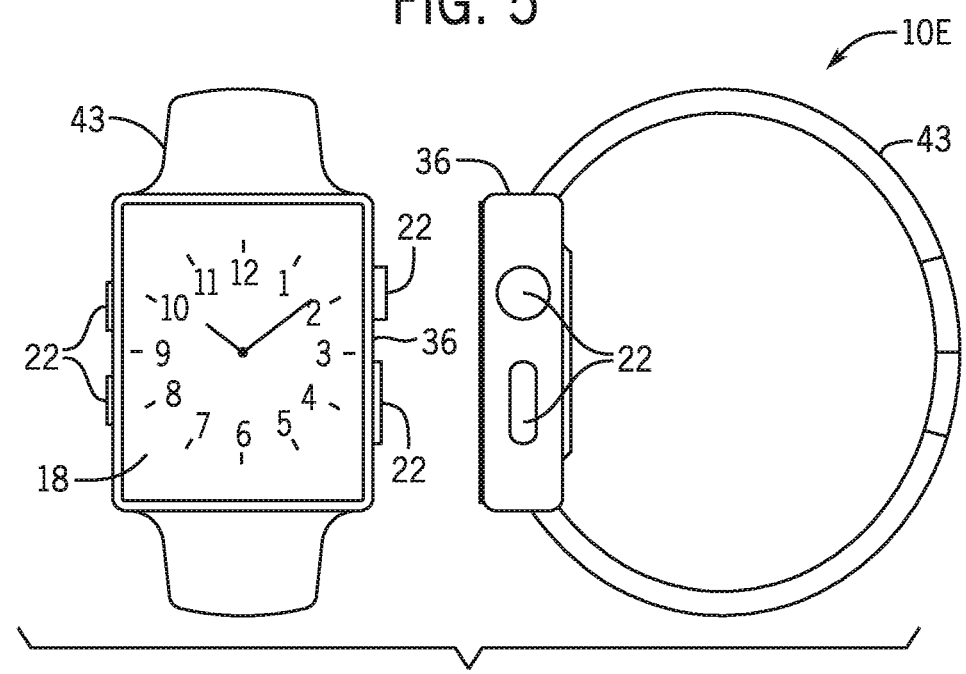
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The processors 12 (e.g., as part of or in the form of a controller) may operate circuitry to input or output data generated by the electronic device 10. For example, the processors 12 may control and/or operate the memory 14, the nonvolatile storage 16, display 18, input structures 22, an input/output (I/O interface) 24, a network interface 26, a transceiver 28, a power source 29, or the like to perform operations of the electronic device 10 and/or to facilitate control of the operations of the electronic device. In particular, the processors 12 may generate control signals for operating the transceiver 28 to transmit data on one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, LTE cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As discussed above, the network interface 26 may include one or more processors 12, such as one or more baseband processors, that manage wireless communication and/or radio functions.

In some embodiments, the electronic device 10 communicates over the aforementioned wireless networks (e.g., WI-FI®, WIMAX®, mobile WIMAX®, 4G, LTE®, 5G, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may also be coupled to or include one or more antennas, and the transmitter may transmit and the receiver may receive RF signals via the one or more antennas to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 30. The power source 30 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
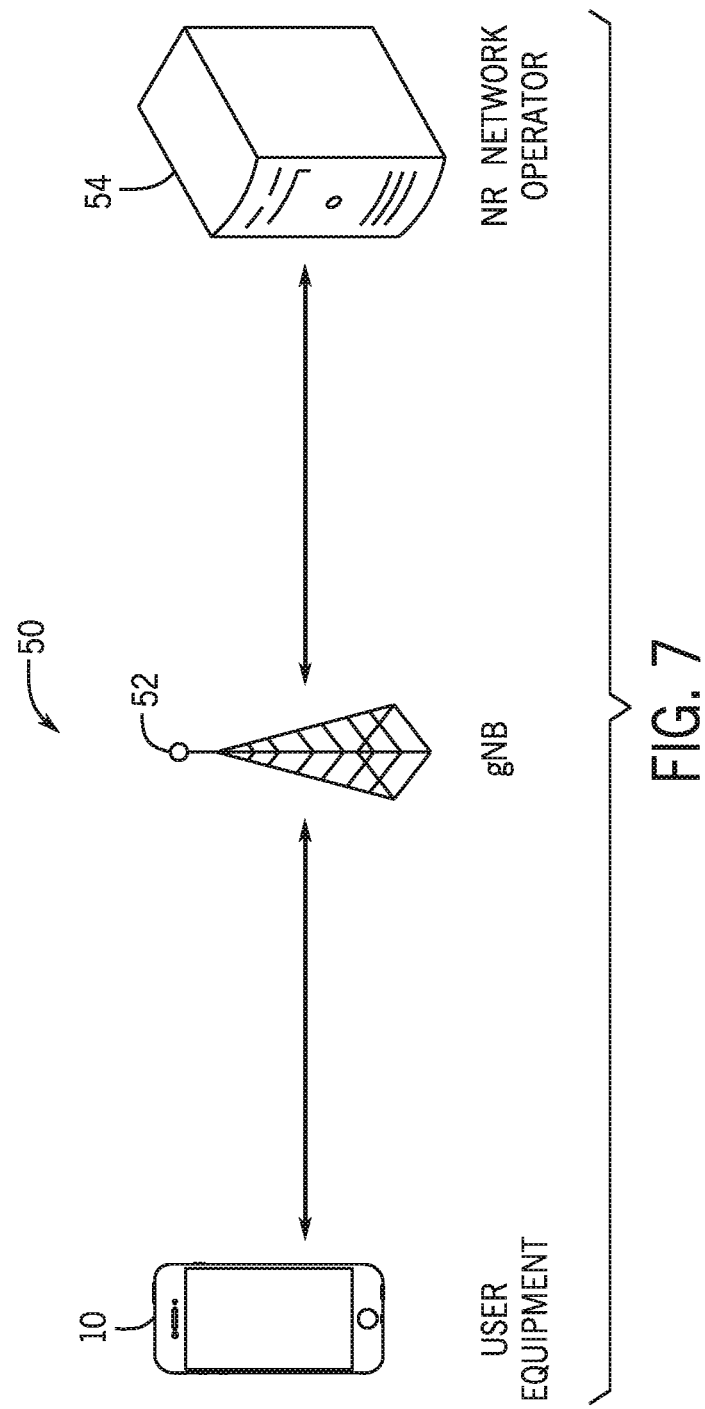
FIG. 7 is a diagram of a communication system, according to embodiments of the present disclosure.

Keeping the foregoing in mind, FIG. 7 is a diagram of a communication system 50, according to embodiments of the present disclosure. The communication system 50 includes the electronic device or user equipment 10, communicatively coupled to a base station 52. The base station 52 may facilitate providing any suitable communication networks, including a $5^{th}$ generation (5G) or New Radio (NR) communication network. Accordingly, the base station 52 may include a next generation NodeB (gNB) for the 5G or NR communication network. The gNB 52 may have one or more components similar to the user equipment 10, and thus may include control circuitry, such as the processor 12, and/or memory circuitry, such as the memory 14 and/or nonvolatile storage 16, which may operate together to respectively cause the gNB 52 to perform respective operations.

The gNB 52 may in turn be communicatively coupled to a network operator or provider 54. The network operator 54 may use the gNB 52 as a physical communication node to deploy a radio network managed by the network operator 54 over one or more cells or regions managed by the gNB 52. In particular, the network operator 54 may deploy a 5G or NR communication network using the gNB 52. It should be understood that, while the present disclosure uses the 5G/NR communication network as an example, the presently disclosure techniques may apply to any suitable communication network where Listen Before Talk (LBT) procedures are performed prior to transmitting or receiving data on a sub-band of a granted channel. LBT refers to the user equipment 10 using a receiver of the transceiver 28 to sense or "listen" to, via one or more antennas of the user equipment 10 that are coupled to or included as part of the transceiver 28, signals received on the sub-band to determine whether there is ongoing communication that may interfere with its transmission and/or reception.

The NR network operator 54 may perform data transmission and reception on licensed or unlicensed frequency spectrums. A licensed spectrum is designated by a governmental or standards body (e.g., the Federal Communications Commission (FCC)) to be served for organizations that have been granted licenses. With such exclusive rights, a license holder operates without interference or spectrum crowding. That is, the FCC provides legal protection and enforcement to prevent other operators from transmitting over the same frequency in the same geographic area.

The NR network operator 54 may also perform data transmission and reception on unlicensed frequency spectrums to take advantage of additional resources in these frequency bands, which include the 5 gigahertz (GHz) band (e.g., 5150-5924 megahertz (MHz)) and the 6 GHz band (e.g., 5925-7125 MHz). It should be noted that the $3^{rd}$ Generation Partnership Project (3GPP) is currently making efforts to standardize NR operation over the unlicensed spectrum. Moreover, the 3GPP may add other frequency spectrums or bands to the unlicensed spectrum, such as the 60 GHz band. Unlike licensed bands, the NR network operator 54 may ensure co-existence with other technologies and systems in the unlicensed spectrum. To do so, the user equipment 10 may perform a Listen Before Talk (LBT) procedure for each channel or portion of a channel prior to transmitting or receiving data on that channel or portion of the channel. Moreover, to increase communication performance on the unlicensed spectrum, the NR network operator 54 may enable wideband operation, which enables allocating channels with larger bandwidths (e.g. 20-80 MHz), and enables the user equipment 10 to perform the LBT procedure on one or more 20 MHz sub-bands of the allocated channels.

Figure 8:
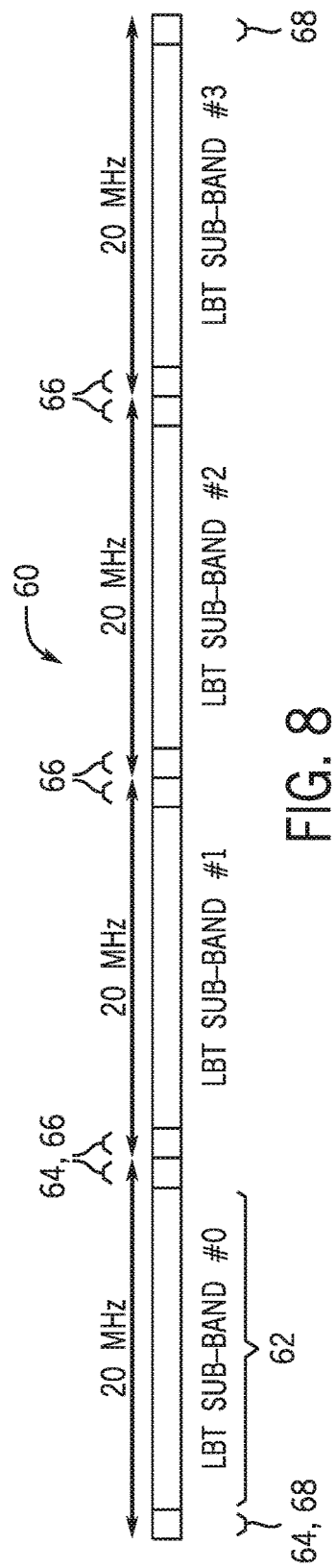
FIG. 8 is a diagram of a channel allocated to user equipment of the communication system of FIG. 7 for wideband operation for which all sub-bands are available, according to embodiments of the present disclosure.

For wideband operation, the user equipment 10 may send its mode capability (e.g., a list of modes under which the user equipment may operate) to the NR network operator 54, and the NR network operator 54 may grant the user equipment 10 operation under one or more modes of the list of modes, as well as an allocated channel. FIG. 8 is a diagram of a channel 60 allocated to the user equipment 10 by the NR network operator 54 for wideband operation, according to embodiments of the present disclosure. As illustrated, the bandwidth of the channel 60 is 80 MHz, though the NR network operator 54 may allocate channels having any suitable bandwidth, such as between 20-80 MHz. Moreover, because the NR network operator 54 may allocate channels with even larger bandwidths to the user equipment 10 (e.g., 100 MHz, 160 MHz, 320 MHz), it should be understood that the 80 MHz channel bandwidth discussed herein is just an example, and any suitable channel bandwidth is contemplated.

The channel 60 includes four sub-bands 62, "LBT sub-band #0", "LBT sub-band #1", "LBT sub-band #2", and "LBT sub-band #3". Only the LBT sub-band #0 is labeled with a reference numeral 62 for the sake of clarity. Each sub-band 62 has a bandwidth of 20 MHz, though it should be understood that the 20 MHz sub-band bandwidth discussed herein is just an example, and any suitable sub-band bandwidth is contemplated. Each sub-band 62 also includes two intra-carrier guard bands 64, which facilitate interference from one sub-band 62 to another.

For a first mode of transmission or uplink operation, transmission by the user equipment 10 is permitted if all the sub-bands 62 of the allocated channel 60 are available or clear of interference. The user equipment 10 may send a message to the gNB 52 to indicate its mode capability (e.g., the one or more modes in which it may operate, such as this first mode of transmission) when requesting the channel 60.

In response, the NR network operator 54 may send a response to the user equipment 10 indicating the one or modes that it may be permitted to operate, as well as an indication of the allocated channel 60. To determine whether each sub-band 62 is available, the user equipment 10 may perform an LBT procedure by sensing or "listening" to the sub-band 62 and determining whether there is ongoing communication and/or noise (e.g., exceeding a threshold level) that may interfere with its transmission and/or reception. In particular, if the user equipment 10 determines that signals received on the sub-band 62 via a receiver of the user equipment 10 are below a threshold signal level, the user equipment 10 may determine that the sub-band 62 is clear or available.

In this case, the user equipment 10 may send a message to the gNB 52 that it is at least capable of operating in the first mode (e.g., "Mode 1") and requesting a channel allocation. The gNB 52 may forward the message onto the NR network operator 54, and, in response, the NR network operator 54 allocates the channel 60 and sends a response to the user equipment 10 (via the gNB 52) that the channel 60 is allocated, and that the user equipment 10 may operate in Mode 1.

The user equipment 10 may then perform LBT procedures on each of the sub-bands 62, and, in this example, determines that all the sub-bands 62 are available or clear for transmission. Accordingly, the user equipment 10 transmits data over all the sub-bands 62 according to Mode 1. Because all of the sub-bands 62 are available, the user equipment 10 may transmit the data over the guard bands 66 that are disposed between the available sub-bands 62, resulting in better spectrum utilization and thus greater transmission rate and efficiency. However, the user equipment 10 may not transmit data on the guard bands 68 that are at the ends of the channel 60, as those border other channels, and may interfere with communications on those other channels or experience interference with communications on those other channels.

An additional consideration is the immediate needs of the user equipment 10 when transmitting data, or the amount of data itself. In particular, even though the NR network operator 54 allocates four sub-bands 62 to the user equipment 10, the user equipment 10 may schedule data for transmission on two of the four sub-bands 62 (e.g., LBT sub-bands #0 and #1). Some practices may require that the user equipment 10 perform LBT procedures on all sub-bands 62 allocated to the user equipment 10, even though the user equipment 10 may only schedule data on some, but not all, of the sub-bands 62 for transmission. Such practices may also prohibit the user equipment 10 from transmission if any of the sub-bands 62 are not clear, even if those unavailable sub-bands would not be used for transmission by the user equipment 10. Accordingly, it may be more efficient for the user equipment 10 to perform the LBT procedures only on a number of sub-bands 62 necessary for transmission of its data (e.g., on LBT sub-bands #0 and #1). This may particularly be true in cases where the channel has a larger bandwidth (e.g., 100 MHz, 120 MHz, 160 MHz, 320 MHz), as there may be a higher likelihood of a sub-band failing an LBT procedure (e.g., thus being unavailable for transmission). In such a case, the NR network operator 54 may be configured to permit the user equipment 10 to transmit on available sub-bands 62 of the allocated channel 60, even if the user equipment 10 determined one or more other sub-bands 62 are unavailable.

As some sub-bands 62 may be unavailable after performing an LBT procedure, in some embodiments, the user equipment 10 may perform the LBT procedures on the sub-bands 62 until a number of sub-bands 62 necessary for transmission is reached. That is, assuming the user equipment 10 needs two sub-bands 62 for transmission, the user equipment 10 may perform LBT procedures on each sub-band until two sub-bands 62 are found to be available. Once the number of sub-bands 62 necessary for transmission is reached, then the user equipment 10 may stop performing LBT procedures, even if there are remaining sub-bands for which LBT procedures have not been performed, and commence transmission on the available sub-bands 62.

In the case that the user equipment 10 only supports Mode 1 or notifies the NR network operator 54 that it only supports Mode 1, and determines that all the sub-bands 62 are available, but does not schedule data on all the sub-bands 62, then, from the viewpoint of the NR network operator 54, the gNB 52, other base stations, other network operators, WiFi devices and/or networks, and/or any other suitable devices or networks, the non-scheduled sub-bands are perceived to be free channels that may thus be occupied by any of these entities. These other entities may determine that data is not scheduled on these sub-bands by monitoring these sub-bands for transmitted data.

It may be worth noting that the NR network operator 54 treats wideband operations for reception or downlink operations in the unlicensed spectrum similarly to transmission on the licensed band, as it assumes that all sub-bands pass the LBT procedure. This is because any potential interference on a sub-band 62 may be from a variety of sources (e.g., other communication systems, system noise), and there may not be enough time for the NR network operator 54 to react to the user equipment 10 sensing the potential interference on the sub-band 62, since the user equipment 10 may notify the gNB 52, which may then notify the NR network operator 54, which may finally respond with an appropriate permitted mode of operation. By the time the user equipment 10 receives the appropriate permitted mode of operation, the potential interference may have disappeared or decreased (e.g., beyond a threshold level), and/or changing modes of operation may cutoff or clip ongoing communication. That is, the user equipment 10 does not have to perform LBT procedures on the sub-bands 62 and accommodate cases where there is ongoing communication and/or noise on the sub-bands 62 for the reception/downlink case. Thus, the user equipment 10 may simply receive data over the sub-bands 62 according to Mode 1, regardless of whether the sub-bands 62 pass the LBT procedure.

Figure 9:
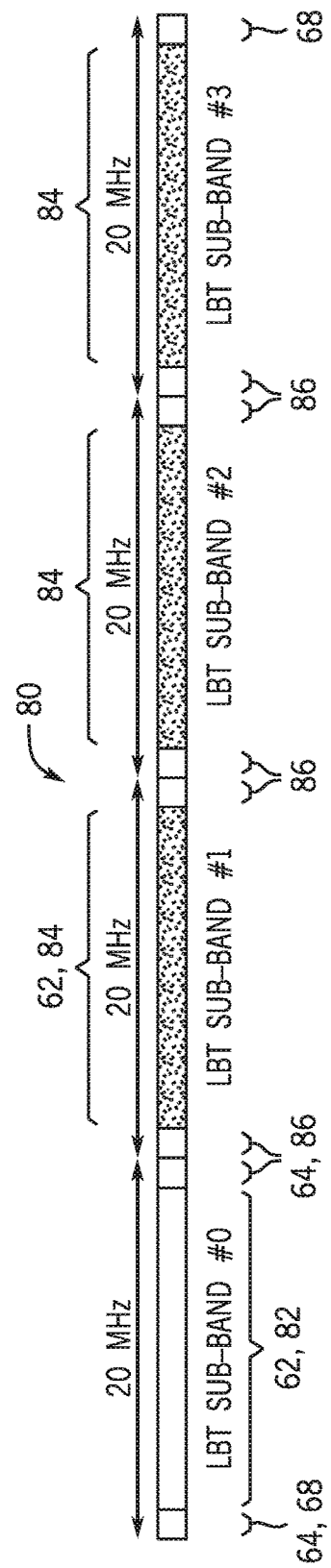
FIG. 9 is a diagram of a channel allocated to the user equipment of the communication system of FIG. 7 for wideband operation in which only one sub-band is determined to be available, according to embodiments of the present disclosure.

As mentioned, in some cases, the user equipment 10 may perform the LBT procedures on the sub-bands 62 of the allocated channel 60 and determine at least some of the sub-bands are unavailable. FIG. 9 is a diagram of a channel 80 allocated to the user equipment 10 by the NR network operator 54 for wideband operation in which only one sub-band 62 is determined to be available, according to embodiments of the present disclosure. In particular, for a second mode of transmission or uplink operation (e.g., "Mode 2a"), transmission by the user equipment 10 is permitted if only one of the sub-bands 62 of the allocated channel 60 is available or clear of interference. The user equipment 10 may send a message to the gNB 52 to indicate its mode capability (e.g., that it may operate under at least Mode 2a) when requesting the channel 80. In response, the NR network operator 54 may send a response to the user equipment 10 indicating that it may be permitted to operate under at least Mode 2a, as well as an indication of the allocated channel 80. The user equipment 10 may perform an LBT procedure on each sub-band 62 to determine whether each sub-band 62 is available.

As illustrated, the user equipment 10 determines that LBT sub-band #0 is available (as indicated by the unshaded sub-band 82), but the LBT sub-bands #1-3 are unavailable (as indicated by the shaded sub-bands 84). Accordingly, the user equipment 10 transmits data over the available sub-band 82 according to Mode 2a. Because there are no contiguous available sub-bands, the user equipment 10 may not transmit data on any of the guard bands 64, as they either border sub-bands 84 that are unavailable or other channels (and thus may include communications or noise on those sub-bands 84 or other channels that may interfere with data transmission, or the data transmission may interfere with communications on those sub-bands 84 or other channels). "Contiguous" available sub-bands refer to available sub-bands that are immediately adjacent to one other (e.g., share an end), while "noncontiguous" available sub-bands refer to sub-bands that are separated by at least one unavailable sub-band. When available sub-bands are contiguous, data may be transmitted over the contiguous sub-bands, including the guard bands in between the sub-bands, as there may be no interfering communications between the available sub-bands. Regarding reception or downlink operations, as previously mentioned, the user equipment 10 does not have to perform LBT procedures on the sub-bands 62 and accommodate cases where there is ongoing communication and/or noise on the sub-bands 62. Thus, the user equipment 10 may simply receive data over the available sub-band 82 according to Mode 2a, regardless of whether the sub-bands 62 pass the LBT procedure.

Figure 10:
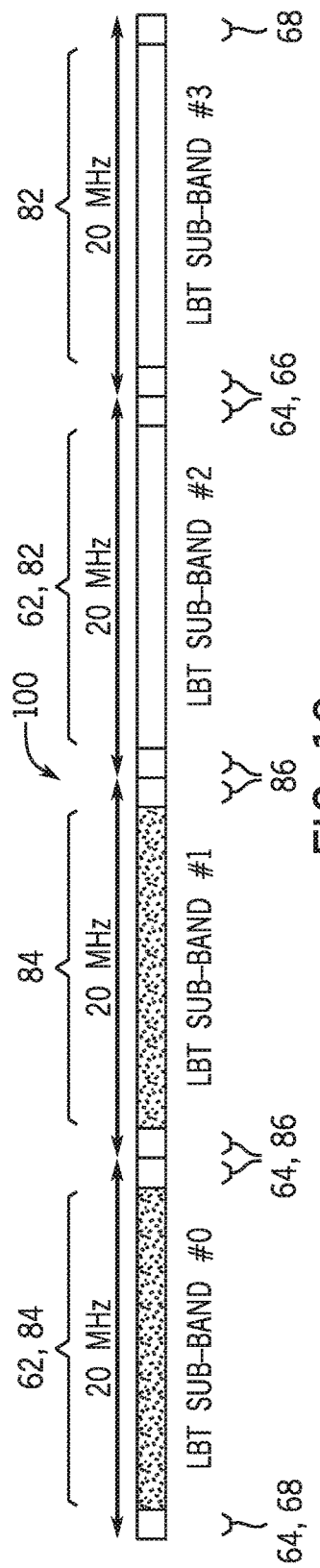
FIG. 10 is a diagram of a channel allocated to the user equipment of the communication system of FIG. 7 for wideband operation in which only one block of contiguous sub-bands is determined to be available, according to embodiments of the present disclosure.

In some cases, the user equipment 10 may perform the LBT procedures on the sub-bands 62 of the allocated channel 60 and determine a single block of contiguous sub-bands is available. FIG. 10 is a diagram of a channel 100 allocated to the user equipment 10 by the NR network operator 54 for wideband operation in which only one block of contiguous sub-bands 62 is determined to be available, according to embodiments of the present disclosure. In particular, for a third mode of transmission or uplink operation (e.g., "Mode 2b"), transmission by the user equipment 10 is permitted if only one block of contiguous sub-bands 62 of the allocated channel 60 is available or clear of interference. The user equipment 10 may send a message to the gNB 52 to indicate its mode capability (e.g., that it may operate under at least Mode 2b) when requesting the channel 100. In response, the NR network operator 54 may send a response to the user equipment 10 indicating that it may be permitted to operate under at least Mode 2b, as well as an indication of the allocated channel 100. The user equipment 10 may perform an LBT procedure on each sub-band 62 to determine whether each sub-band 62 is available. In some embodiments, the second mode (Mode 2a) and the third mode (Mode 2b) may be combined into a single mode ("Mode 2"). Accordingly, the user equipment 10 may send a message to the gNB 52 to indicate that it may operate under at least Mode 2, and the NR network operator 54 may send a response to the user equipment 10 indicating that it may be permitted to operate under at least Mode 2.

As illustrated, the user equipment 10 determines that LBT sub-bands #0 and 1 are unavailable (as indicated by the shaded sub-bands 84), but the block of contiguous LBT sub-bands #2 and 3 are available (as indicated by the unshaded sub-bands 82). Accordingly, the user equipment 10 transmits data over the available block of contiguous sub-bands 82 according to Mode 2b. Because the guard bands 66 are disposed between the available block of contiguous sub-bands 82, the user equipment 10 may also transmit data on the guard bands 66. However, the user equipment 10 may not transmit data on the guard bands 68, 86, as they either border sub-bands 84 that are unavailable (e.g., 86) or other channels (e.g., 68), which may include communications or noise that may interfere with data transmission, or the data transmission may interfere with communications on those sub-bands 84 or other channels. Regarding reception or downlink operations, as previously mentioned, the user equipment 10 does not have to perform LBT procedures on the sub-bands 62 and accommodate cases where there is ongoing communication and/or noise on the sub-bands 62. Thus, the user equipment 10 may simply receive data over the available block of contiguous sub-bands 82 according to Mode 2b, regardless of whether the sub-bands 62 pass the LBT procedure.

However, there is not an operational mode that enables data transmission on multiple noncontiguous available sub-bands and/or blocks of contiguous available sub-bands in an allocated channel (though there may be an operational mode to receive data on multiple noncontiguous available sub-bands and/or blocks of contiguous available sub-bands), and, accordingly, the user equipment 10 may not transmit data over the multiple noncontiguous available sub-bands and/or blocks of contiguous available sub-bands in such a scenario. It should be understood that multiple noncontiguous available sub-bands and/or blocks of contiguous available sub-bands refers to multiple noncontiguous available sub-bands in the allocated channel, multiple blocks of contiguous available sub-bands in the allocated channel, and/or at least one available sub-band and at least one block of contiguous available sub-bands in the allocated channel. Such a configuration of available sub-bands for which there is no applicable operational mode may be referred as "punctured transmission", as at least one unavailable sub-band is disposed between two available sub-bands.

FIG. 11 is a diagram of a channel 110 allocated to the user equipment 10 by the NR network operator 54 for wideband operation in which multiple, noncontiguous sub-bands 62 are determined to be available, according to embodiments of the present disclosure. As illustrated, the user equipment 10 determines that noncontiguous LBT sub-bands #0 and 3 are available (as indicated by the unshaded sub-bands 82), and LBT sub-bands #1 and 2 are unavailable (as indicated by the shaded sub-bands 84).

As noted, there is not an operational mode that enables data transmission on multiple noncontiguous available sub-bands 82 in the channel 110, and, accordingly, the user equipment 10 may not send a message to the gNB 52 to indicate that it may operate under such a mode when requesting the channel 110. However, Mode 2a permits the user equipment 10 to transmit if only one of the sub-bands 62 of the allocated channel 60 is available. The presently disclosed embodiments enable the user equipment 10 to select one of the noncontiguous available sub-bands 82 in the channel 110, and transmit data on the selected sub-band 82, thus fulfilling the criteria of operating under Mode 2a (e.g., "fallback" to operating under Mode 2a). That is, the user equipment 10 selects one of the noncontiguous available sub-bands 82 to transmit data, and treats all other sub-bands 82 as unavailable, regardless of whether they are available or not. For example, the user equipment 10 may select the noncontiguous LBT sub-band #0 for data transmission, and not transmit data on LBT sub-bands #1-3, thus treating LBT sub-bands #1-3 as unavailable, even though LBT sub-band #3 is available.

While the user equipment 10 may arbitrarily select the sub-band 82 on which to transmit data (e.g., by random selection, by selecting the first sub-band 82 that is available), the user equipment 10 may additionally or alternatively select the sub-band 82 based on one or more communication quality factors. For example, the user equipment 10 may determine an amount of data granted or scheduled for transmission (e.g., the grant size) of each noncontiguous available sub-band 82 of the channel 110, and select the noncontiguous available sub-band 82 that has the largest grant size for transmission under Mode 2a. As another example, the user equipment 10 may determine a signal quality of each noncontiguous available sub-band 82 of the channel 110, and select the one sub-band out of the set of noncontiguous available sub-bands 82 that has the best signal quality for transmission under Mode 2a. As yet another example, the user equipment 10 may estimate throughput for each noncontiguous available sub-band 82 of the channel 110, and select the one sub-band out of the set of noncontiguous available sub-bands 82 that has the greatest estimated throughput. As another example, the user equipment 10 may determine a priority level of each noncontiguous available sub-band 82 of the channel 110 (e.g., certain sub-bands 82 may be preferred and have a higher priority level than others, which may result in better performance compared to the other sub-bands 82), and select the one sub-band out of the set of noncontiguous available sub-bands 82 that has the highest priority level for transmission under Mode 2a. It should be understood that the user equipment 10 may any combination or all of the factors described above, as well as any other suitable factors that affect communication quality.

Accordingly, the user equipment 10 may select one sub-band out of the set of noncontiguous available sub-bands 82 and transmits data over the selected sub-band 82 according to Mode 2a. Because Mode 2a only allows transmission over a single sub-band 82, the user equipment 10 may not transmit data over any other available sub-band 82. Moreover, because there are no contiguous available sub-bands, all the guard bands 64 either border sub-bands 84 that are unavailable (e.g., 86) or other channels (e.g., 68), which may include communications or noise may interfere with data transmission, or the data transmission may interfere with communications on those sub-bands 84 or other channels. Regarding reception or downlink operations, as previously mentioned, the user equipment 10 does not have to perform LBT procedures on the sub-bands 62 and accommodate cases where there is ongoing communication and/or noise on the sub-bands 62. Thus, the user equipment 10 may simply receive data over the available block of contiguous sub-bands 82 according to Mode 2a, regardless of whether the sub-bands 62 pass the LBT procedure.

FIG. 12 is a diagram of a channel 120 allocated to the user equipment 10 by the NR network operator 54 for wideband operation in which a noncontiguous sub-band 62 and a noncontiguous block of contiguous sub-bands 62 are determined to be available, according to embodiments of the present disclosure. As illustrated, the user equipment 10 determines that a noncontiguous (with respect to the noncontiguous sub-band 62) block of contiguous LBT sub-bands #0 and 1 are available (as indicated by the unshaded sub-bands 82), a noncontiguous (with respect to the noncontiguous block of contiguous sub-bands 62) LBT sub-band #3 is available, and LBT sub-band #2 is unavailable (as indicated by the shaded sub-bands 84).

As noted, there is not an operational mode that enables data transmission on multiple noncontiguous available sub-bands 82 and/or blocks of contiguous available sub-bands 82 in the channel 120, and, accordingly, the user equipment 10 may not send a message to the gNB 52 to indicate that it may operate under such a mode when requesting the channel 120. However, Mode 2b permits the user equipment 10 to transmit if only one block of contiguous sub-bands 62 of the allocated channel 120 is available. The presently disclosed embodiments enable the user equipment 10 to select the noncontiguous block of available contiguous sub-bands 82 in the channel 120, and transmit data on the selected sub-band 82, thus fulfilling the criteria of operating under Mode 2a. It should be understood that, for channels with larger bandwidths (e.g., 100 MHz, 120 MHz, 160 MHz, 320 MHz, and so on), there may be multiple noncontiguous blocks of contiguous available sub-bands 82, and the user equipment 10 may select a block of contiguous available sub-bands 82 from among the noncontiguous blocks of contiguous available sub-bands 82 to transmit data. That is, the user equipment 10 selects one of the multiple noncontiguous available sub-bands 82 and/or blocks of contiguous available sub-bands 82 to transmit data, and treats all other sub-bands 82 as unavailable, regardless of whether they are available or not. For example, the user equipment 10 may select the noncontiguous block of contiguous LBT sub-bands #0 and 1 for data transmission, and not transmit data on LBT sub-bands #2 and 3, thus treating LBT sub-bands #2 and 3 as unavailable, even though LBT sub-band #3 is available.

While the user equipment 10 may arbitrarily select the noncontiguous block of contiguous available sub-bands 82 on which to transmit data (e.g., by random selection, by selecting the first noncontiguous block of contiguous available sub-bands 82 that is available), the user equipment 10 may additionally or alternatively select the noncontiguous block of contiguous available sub-bands 82 based on one or more communication quality factors. For example, the user equipment 10 may determine a size of each noncontiguous block of contiguous available sub-bands 82 and/or each noncontiguous available sub-band 82, and select the noncontiguous block of contiguous available sub-bands 82 and/or noncontiguous available sub-band 82 with the greatest size (e.g., bandwidth) for transmission under Mode 2b. For noncontiguous blocks of contiguous available sub-bands 82, this may include adding up the bandwidth for each contiguous available sub-band 82 in each block, including the bandwidth of the guard bands that are between the contiguous available sub-bands 82. Typically, this will mean that the block of contiguous available sub-bands 82 with the greatest number of sub-bands 82 will be selected.

In some embodiments, if there are multiple noncontiguous blocks of contiguous available sub-bands 82 and/or noncontiguous available sub-bands 82 with the greatest size, then the user equipment 10 may use additional or alternative factors to select a block of contiguous available sub-bands 82 and/or one sub-band out of the set of noncontiguous available sub-bands 82 among the multiple noncontiguous blocks of contiguous available sub-bands 82 and/or noncontiguous available sub-bands 82 with the greatest size to transmit data. For example, the user equipment 10 may determine the grant size of each block of contiguous available sub-bands 82 and/or each noncontiguous available sub-band 82 of the channel 120, and select the block of contiguous available sub-bands 82 and/or noncontiguous available sub-band 82 that has the largest grant size for transmission under Mode 2b, where grant size refers to the total payload capacity associated with the uplink grant's bandwidth, duration, modulation scheme, and coding rate.

As another example, the user equipment 10 may determine a signal quality of each block of contiguous available sub-bands 82 and/or each sub-band out of the set of noncontiguous available sub-bands 82 of the channel 120, and select the block of contiguous available sub-bands 82 and/or one sub-band out of the set of noncontiguous available sub-bands 82 that has the best signal quality for transmission under Mode 2b. As yet another example, the user equipment 10 may estimate throughput for each block of contiguous available sub-bands 82 and/or each sub-band out of the set of noncontiguous available sub-bands 82 of the channel 120, and select the block of contiguous available sub-bands 82 and/or one sub-band out of the set of noncontiguous available sub-bands 82 that has the greatest estimated throughput. As another example, the user equipment 10 may determine a priority level of each block of contiguous available sub-bands 82 and/or each sub-band out of the set of noncontiguous available sub-bands 82 of the channel 120, and select the block of contiguous available sub-bands 82 and/or one sub-band out of the set of noncontiguous available sub-bands 82 that has the highest priority level for transmission under Mode 2b. It should be understood that the user equipment 10 may support any combination or all of the factors described above, as well as any other suitable factors that affect communication quality.

Accordingly, the user equipment 10 may select a block of contiguous available sub-bands 82 and transmits data over the selected block of contiguous available sub-bands 82 according to Mode 2b. Because Mode 2b only allows transmission over a single block of contiguous sub-bands 82, the user equipment 10 may not transmit data over any other available sub-band 82. Moreover, guard bands 66 between the contiguous available sub-bands 82 of the selected block of contiguous available sub-bands 82 may also be used to transmit data. However, any guard bands 64 that are not between the contiguous available sub-bands 82 of the selected block of contiguous available sub-bands 82 may not be used to transmit data, as such guard bands 64 either border sub-bands 84 that are unavailable (e.g., 86) or other channels (e.g., 68), which may include communications or noise may interfere with data transmission, or the data transmission may interfere with communications on those sub-bands 84 or other channels. Regarding reception or downlink operations, as previously mentioned, the user equipment 10 does not have to perform LBT procedures on the sub-bands 62 and accommodate cases where there is ongoing communication and/or noise on the sub-bands 62. Thus, the user equipment 10 may simply receive data over the available block of contiguous sub-bands 82 according to Mode 2b, regardless of whether the sub-bands 62 pass the LBT procedure.

Figure 13:
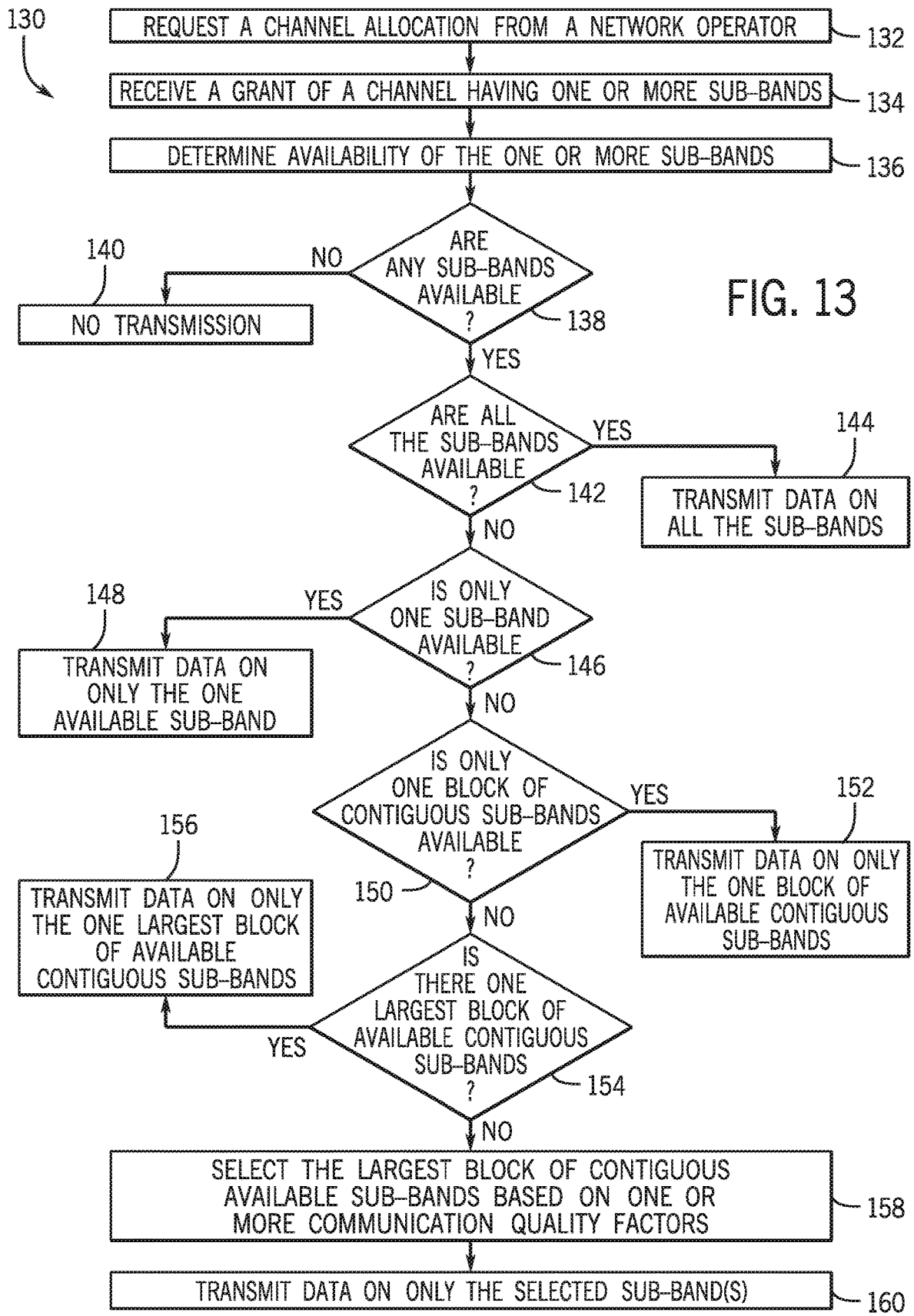
FIG. 13 is a flowchart of a method for transmitting data for a wideband operation, according to embodiments of the present disclosure.

FIG. 13 is a flowchart of a method 130 for transmitting data for a wideband operation, according to embodiments of the present disclosure. In particular, the method 130 may transmit data even when there are multiple noncontiguous available sub-bands 62 and/or blocks of contiguous available sub-bands 62 in a channel. It is noted that, although depicted in a particular order, the blocks of the method 130 may be performed in any suitable order, and at least some blocks may be skipped altogether. As described herein, the method 130 is described as performed by the user equipment 10. However, it should be understood that any suitable processing and/or control circuitry may perform some or all of the operations of the method 130, such as one or more of the processors 12 (including one or more baseband processors).

At block 132, the user equipment 10 requests a channel allocation from a network operator. In particular, the user equipment 10 may send a message to the gNB 52 requesting the channel allocation, which may in turn be sent to the NR network operator 54. For wideband operation, the channel may have a bandwidth of 20-80 MHz with sub-bands having bandwidths of 20 MHz, though any suitable channel bandwidth (e.g., greater than 80 MHz, 160 MHz, 320 MHz) and any suitable sub-band bandwidth is contemplated. The message may also include an indication of mode capability (e.g., the one or more modes in which it may operate) of the user equipment 10.

At block 134, the user equipment 10 receives a grant of a channel having one or more sub-bands. In particular, the NR network operator 54 may grant the channel and indicate for which modes the user equipment 10 may operate when using the channel. The NR network operator 54 may send a message back to the user equipment 10 indicating the grant of the channel and the modes for which the user equipment 10 may operate via the gNB 52.

At block 136, the user equipment 10 determines availability of the one or more sub-bands 62 of the allocated channel. The user equipment 10 may perform a LBT procedure on each sub-band 62 to determine whether the sub-band 62 is available or clear of interfering communications or noise. At block 138, the user equipment 10 determines whether any sub-bands 62 are available. If not, then, at block 140, the user equipment 10 does not transmit data, as all sub-bands 62 have ongoing communication or noise present in the sub-bands 62, and such communication or noise may decrease the quality of the data intended to be transmitted.

If the user equipment 10 determines there are sub-bands 62 available, then, at block 142, the user equipment 10 determines whether all the sub-bands 62 of the channel are available. If so, and if the NR network operator 54 permits the user equipment 10 to operate in a first mode where transmission by the user equipment 10 is permitted if all the sub-bands 62 of the allocated channel are available (e.g., Mode 1), then, in block 144, the user equipment 10 transmits data on all the sub-bands 62 of the allocated channel. FIG. 8 describes such a scenario where all sub-bands 62 of the channel 60 are available.

If the user equipment 10 determines that all the sub-bands 62 are not available, then, at block 146, the user equipment 10 determines whether there is only one sub-band 62 available. If so, and if the NR network operator 54 permits the user equipment 10 to operate in a second mode where transmission by the user equipment 10 is permitted if only one sub-band 62 of the allocated channel is available (e.g., Mode 2a), then, in block 148, the user equipment 10 transmits data on only the one available sub-band 62 of the allocated channel. FIG. 9 describes such a scenario where only one sub-band 82 of the channel 80 is available.

If the user equipment 10 determines that there is not only one sub-band 62 available, then, at block 150, the user equipment 10 determines whether there is only one block of contiguous sub-bands 62 available. If so, and if the NR network operator 54 permits the user equipment 10 to operate in a third mode where transmission by the user equipment 10 is permitted if only one block of contiguous sub-bands 62 of the allocated channel is available (e.g., Mode 2b), then, in block 152, the user equipment 10 transmits data on the one available block of contiguous sub-bands 62 of the allocated channel. FIG. 10 describes such a scenario where only one block of contiguous sub-bands 82 of the channel 100 is available.

If the user equipment 10 determines that there is not only one block of contiguous sub-bands 62 available, then that means there are multiple noncontiguous available sub-bands 62 and/or blocks of contiguous available sub-bands 62 on the channel. In this case, at block 154, the user equipment 10 determines whether there is one largest block of available contiguous sub-bands 62. If so, then there is at least one block of contiguous available sub-bands 62 on the channel. FIG. 12 describes such a scenario where there is one largest block of available contiguous sub-bands 62 (LBT sub-band #0 and 1) on the channel 120. If the NR network operator 54 permits the user equipment 10 to operate in the third mode where transmission by the user equipment 10 is permitted if only one block of contiguous sub-bands 62 of the allocated channel is available (e.g., Mode 2b), at block 156, the user equipment 10 transmits data on only the largest block of available contiguous sub-bands 62. To meet the criteria of Mode 2b, the user equipment 10 may not transmit data on any other sub-band of the channel, even if another sub-band is available.

If the user equipment 10 determines that there is not one largest block of available contiguous sub-bands 62, then, in block 158, the user equipment 10 determines and selects largest block of contiguous available sub-bands 62 or the largest available sub-band 62 based on one or more communication quality factors. In particular, the user equipment 10 may determine and select the largest block of contiguous available sub-bands 62 or the largest available sub-band 62 with the largest grant size, the best signal quality, the greatest estimated throughput, and/or the highest priority level. FIG. 11 describes such a scenario where there is not one largest block of available contiguous sub-bands 62, as there are two available sub-bands 62 (that are equal in size) on the channel 110. If a block of contiguous available sub-bands 62 is selected, and the NR network operator 54 permits the user equipment 10 to operate in the third mode where transmission by the user equipment 10 is permitted if only one block of contiguous sub-bands 62 of the allocated channel is available (e.g., Mode 2b), at block 160, the user equipment 10 transmits data on only the selected largest block of available contiguous sub-bands 62. If a sub-band 62 is selected, and the NR network operator 54 permits the user equipment 10 to operate in the second mode where transmission by the user equipment 10 is permitted if only one sub-band 62 of the allocated channel is available (e.g., Mode 2a), at block 160, the user equipment 10 transmits data on the selected sub-band 62. To meet the criteria of Mode 2a, the user equipment 10 may not transmit data on any other sub-band of the channel, even if another sub-band is available.

In this manner, the method 130 may transmit data in a wideband operation mode even when there are multiple noncontiguous available sub-bands 62 and/or blocks of contiguous available sub-bands 62 in an allocated channel. As discussed above, in cases where data is transmitted using contiguous available sub-bands 62, guard bands 64 disposed in between the contiguous available sub-bands 62 may also be used to transmit data.

Figure 14:
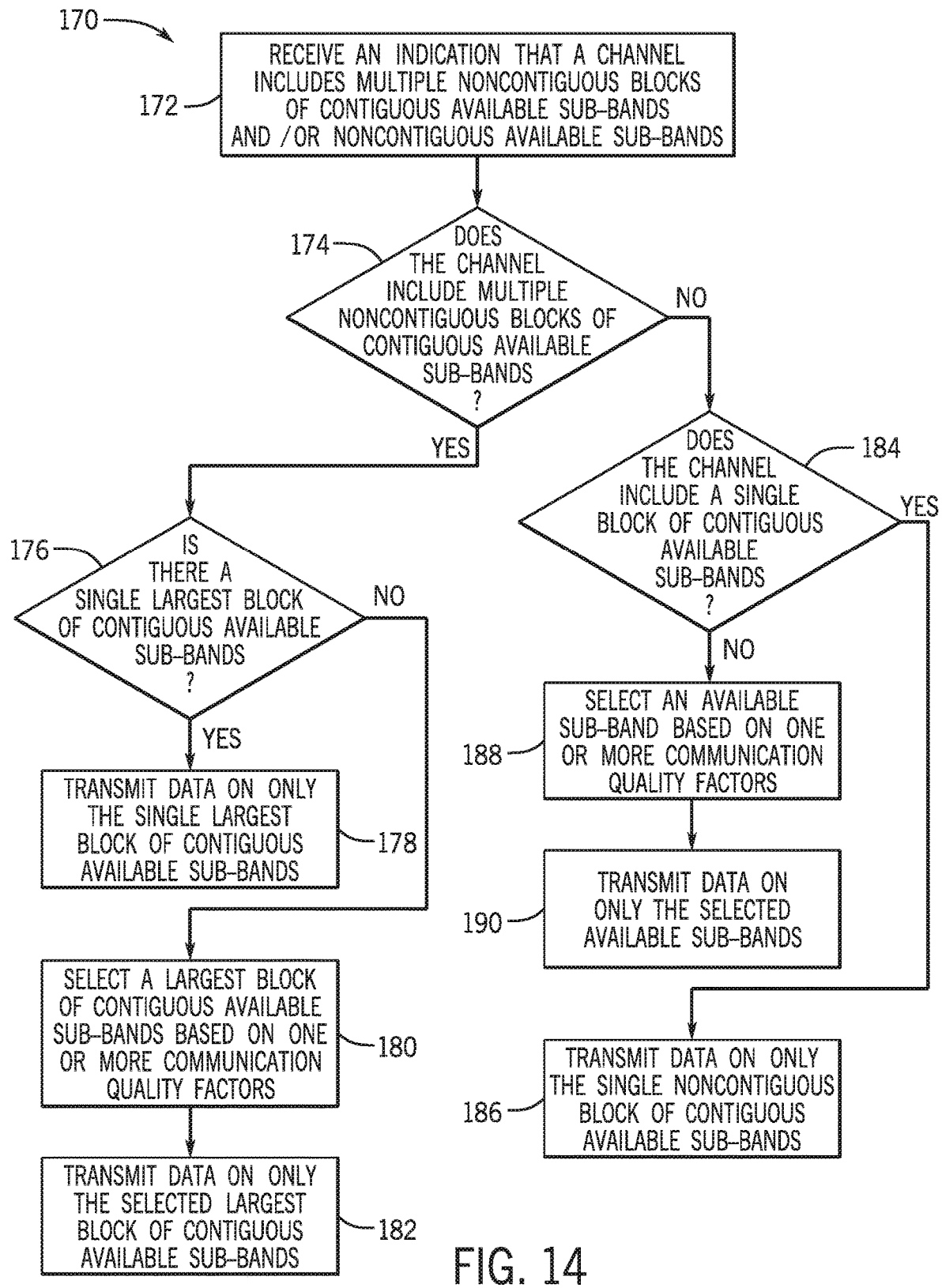
FIG. 14 is a flowchart of a method for transmitting data for a wideband operation when there are multiple noncontiguous available sub-bands and/or blocks of contiguous available sub-bands in a channel, according to embodiments of the present disclosure.

More specifically, FIG. 14 is a flowchart of a method 170 for transmitting data for a wideband operation when there are multiple noncontiguous available sub-bands 62 and/or blocks of contiguous available sub-bands 62 in a channel, according to embodiments of the present disclosure. It is noted that, although depicted in a particular order, the blocks of the method 170 may be performed in any suitable order, and at least some blocks may be skipped altogether. As described herein, the method 170 is described as performed by the user equipment 10. However, it should be understood that any suitable processing and/or control circuitry may perform some or all of the operations of the method 170, such as one or more of the processors 12.

At block 172, the user equipment 10 receives an indication that a channel includes multiple noncontiguous available sub-bands 62 and/or blocks of contiguous available sub-bands 62. In particular, the user equipment 10 may indicate to the NR network operator 54 that it is capable of operating under at least Mode 2 (e.g., including Mode 2a and Mode 2b), such that the user equipment 10 may transmit data over a single available sub-band 62 or a single block of contiguous available sub-bands 62. The NR network operator 54 may grant a channel to the user equipment 10 and permit the user equipment 10 to operate in at least Mode 2. The user equipment 10 may perform LBT procedures on each sub-band 62 of the granted channel, and may determine that the channel includes multiple noncontiguous available sub-bands 62 and/or blocks of contiguous available sub-bands 62. As a reminder, as used herein, multiple noncontiguous available sub-bands and/or blocks of contiguous available sub-bands refers to multiple noncontiguous available sub-bands in a channel, multiple blocks of contiguous available sub-bands in the channel, and/or at least one available sub-band and at least one block of contiguous available sub-bands in the channel.

At block 174, the user equipment 10 determines whether there are multiple noncontiguous blocks of contiguous available sub-bands 62 on the channel. If so, at block 176, the user equipment 10 determines whether there is a single largest block of available contiguous sub-bands 62. If so, then, at block 178, the user equipment 10 transmits data only on the single largest block of available contiguous sub-bands 62.

If the user equipment 10 determines that there is not a single largest block of available contiguous sub-bands 62, then, at block 180, the user equipment 10 selects a largest block of contiguous available sub-bands 62 based on one or more communication factors. In particular, the user equipment 10 may select the largest block of contiguous available sub-bands 62 that has the largest grant size, the best signal quality, the greatest estimated throughput, and/or the highest priority level. At block 182, the user equipment 10 transmits data on only the selected largest block of contiguous available sub-bands 62.

Returning to block 174, if the user equipment 10 determines that there are not multiple noncontiguous blocks of contiguous available sub-bands 62 on the channel, then, at block 184, the user equipment 10 determines whether the channel includes a single block of contiguous available sub-bands 62. If so, the user equipment 10 transmits data on only the single noncontiguous block of contiguous available sub-bands 62 at block 186.

If the user equipment 10 determines that there is not a single noncontiguous block of contiguous available sub-bands 62 on the channel, then, at block 188, the user equipment 10 selects an available sub-band 62 based on one or more communication factors. In particular, the user equipment 10 may select the available sub-band 62 that has the largest grant size, the best signal quality, the greatest estimated throughput, and/or the highest priority level. At block 190, the user equipment 10 transmits data on only the selected available sub-band 62.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for wireless communication comprising:
requesting a channel allocation from a network operator;
receiving a grant of a channel having a plurality of sub-bands, wherein the channel comprises a plurality of guard bands disposed between each sub-band of the plurality of sub-bands;
determining availability of the plurality of sub-bands;
determining that the plurality of sub-bands comprises a block of contiguous available sub-bands and at least one available sub-band, the block of contiguous available sub-bands being noncontiguous with the at least one available sub-band and comprising a sub-plurality of guard bands of the plurality of guard bands disposed between each sub-band of the block of contiguous sub-bands; and
transmitting data on only the block of contiguous available sub-bands, at least a portion of the data being transmitted on the sub-plurality of guard-bands.

2. The method of claim 1, wherein the channel comprises frequencies in an unlicensed spectrum.

3. The method of claim 1, wherein the channel comprises frequencies of between 5150-5925 megahertz.

4. The method of claim 1, wherein the channel comprises frequencies of between 5925-7125 megahertz.

5. The method of claim 1, wherein each sub-band of the plurality of sub-bands comprises a bandwidth of 20 megahertz.

6. The method of claim 1, wherein the channel comprises a bandwidth of 60 to 320 megahertz.

7. One or more tangible, non-transitory, computer-readable storage media comprising executable instructions that, when executed by one or more processors, cause the one or more processors to:
request a channel allocation from a network operator;
receive a grant of a channel having a plurality of sub-bands;
determine availability of the plurality of sub-bands;
in response to determining that all sub-bands of the plurality of sub-bands are available, transmit data on all the sub-bands of the plurality of sub-bands in a first mode of operation;
in response to determining that only one sub-band or only one block of contiguous sub-bands of the plurality of sub-bands are available, transmit the data on the only one sub-band or the only one block of contiguous sub-bands of the plurality of sub-bands in a second mode of operation; and
in response to determining that multiple noncontiguous blocks of contiguous sub-bands of the plurality of sub-bands are available, multiple noncontiguous sub-bands of the plurality of sub-bands are available, or at least one noncontiguous blocks of contiguous sub-bands and at least one sub-band of the plurality of sub-bands are available, transmit the data on only one of the multiple noncontiguous blocks, only one of the multiple noncontiguous sub-bands, or only one of the at least one noncontiguous blocks of contiguous sub-bands and the at least one sub-band of the plurality of sub-bands, enabling the second mode of operation.

8. The one or more tangible, non-transitory, computer-readable storage media of claim 7, wherein the instructions that, when executed by the one or more processors, cause the one or more processors to request the channel allocation from the network operator by sending a message to the network operator, wherein the message comprises an indication of a capability of operating using at least the second mode of operation.

9. The one or more tangible, non-transitory, computer-readable storage media of claim 8, wherein the instructions that, when executed by the one or more processors, cause the one or more processors to receive an additional grant of operating using at least the second mode of operation.

10. The one or more tangible, non-transitory, computer-readable storage media of claim 7, wherein the instructions that, when executed by the one or more processors, cause the one or more processors to determine that the multiple noncontiguous blocks of contiguous sub-bands of the plurality of sub-bands are available, determine a largest block of the multiple noncontiguous blocks of contiguous sub-bands, and transmit data on the largest block of the multiple noncontiguous blocks of contiguous sub-bands.

11. The one or more tangible, non-transitory, computer-readable storage media of claim 7, wherein the instructions that, when executed by the one or more processors, cause the one or more processors to determine that one noncontiguous block of contiguous sub-bands and at least the one sub-band of the plurality of sub-bands are available, and transmit data on the one noncontiguous block of contiguous sub-bands.

12. The one or more tangible, non-transitory, computer-readable storage media of claim 7, wherein the instructions that, when executed by the one or more processors, cause the one or more processors to determine that the multiple noncontiguous sub-bands of the plurality of sub-bands are available, determine a noncontiguous sub-band of the multiple noncontiguous sub-bands having a largest grant size, a best signal quality, a greatest estimated throughput, a highest priority level, or any combination thereof, and transmit data on the noncontiguous sub-band.

13. The one or more tangible, non-transitory, computer-readable storage media of claim 7, wherein the instructions that, when executed by the one or more processors, cause the one or more processors to determine that the multiple noncontiguous sub-bands of the plurality of sub-bands are available, determine a noncontiguous sub-band of the multiple noncontiguous sub-bands having a largest grant size, a best signal quality, a greatest estimated throughput, a highest priority level, or any combination thereof, and transmit data on the noncontiguous sub-band.

14. An electronic device for wireless communication comprising:
a transmitter configured to transmit uplink data;
a receiver configured to receive downlink data;
one or more processors communicatively coupled to the transmitter and the receiver, wherein the one or more processors are configured to:
send a request for a channel allocation to a network operator via the transmitter;

receive a grant of a channel having a plurality of sub-bands via the receiver;

determine availability of the plurality of sub-bands via the receiver by receiving signals on each sub-band of the plurality of sub-bands and determining that the signals are below a quality threshold;

determine that the plurality of sub-bands comprises a plurality of noncontiguous blocks of contiguous sub-bands that are available, a plurality of noncontiguous sub-bands that are available, or both; and transmit the uplink data on only one of the plurality of noncontiguous blocks of contiguous sub-bands or only one of the plurality of noncontiguous sub-bands that are available via the transmitter.

15. The electronic device of claim 14, wherein the plurality of sub-bands comprises at least the plurality of noncontiguous blocks of contiguous sub-bands that are available, the one or more processors are configured to determine a largest noncontiguous block of contiguous sub-bands of the plurality of noncontiguous blocks, and the only one of the plurality of noncontiguous blocks of contiguous sub-bands comprises the largest noncontiguous block of contiguous sub-bands.

16. The electronic device of claim 14, wherein the plurality of sub-bands comprises at least the plurality of noncontiguous blocks of contiguous sub-bands that are available, the one or more processors are configured to determine a plurality of largest blocks of contiguous sub-bands of the plurality of noncontiguous blocks, the one or more processors are configured to determine a block of contiguous sub-bands of the plurality of largest blocks having a largest grant size, a best signal quality, a greatest estimated throughput, a highest priority level, or any combination thereof, and the only one of the plurality of noncontiguous blocks of contiguous sub-bands comprises the block of contiguous sub-bands.

17. The electronic device of claim 14, wherein the plurality of sub-bands comprises the plurality of noncontiguous sub-bands that are available, the one or more processors are configured to determine a noncontiguous sub-band of the plurality of noncontiguous sub-bands having a largest grant size, a best signal quality, a greatest estimated throughput, a highest priority level, or any combination thereof, and transmit the uplink data on the noncontiguous sub-band.

* * * * *